United States Patent Office 3,490,925
Patented Jan. 20, 1970

3,490,925
WATER REPELLENT
Rodney A. Blomfield, Madison, Ohio, assignor to Diamond Shamrock Corporation, a corporation of Delaware
No Drawing. Filed Mar. 15, 1967, Ser. No. 623,220
Int. Cl. C09k *3/18*
U.S. Cl. 106—2        19 Claims

ABSTRACT OF THE DISCLOSURE

A composition for imparting water repellency to a surface comprises a mixture of (a) from 1 to 5% by weight of a Werner-type chromium co-ordination compound, (b) from 2 to 10% by weight of a fatty acid quaternary ammonium chloride and (c) from 15 to 35% by weight of an aluminum salt of a fatty acid, said mixture being in solution in a halogenated organic solvent such as perchloroethylene. Optionally up to 10% by weight of a microcrystalline petroleum wax may be included in the above composition. The described water repellent composition is obtained by first dissolving the co-ordination compound and the fatty acid quaternary ammonium chloride in the halogenated organic solvent followed by the addition and dissolution of the aluminum salt. These compositions find special use in the dry cleaning industry wherein they are used, diluted with a dry cleaning solvent such as perchloroethylene or Stoddard solvent, to impart a water repellent finish to textile fabrics.

BACKGROUND OF THE INVENTION

A number of preparation are known for imparting water repellent properties to surfaces such as textiles which surfaces are normally relatively water-permeable. While many of these water repellent preparations have found extensive use and are to some extent satisfactory, no preparation has heretofore been available which combines all the desirable properties of a water repellent while minimizing or eliminating the undersirable side effects. Among the disadvantages incurred by use of the prior art preparations are included such matters as: relatively low flash points thereby creating a potential fire hazard in their use; yellowing of textile fabrics treated therewith, cotton fabric being especially susceptible to this yellowing; residual and unpleasant odors on the treated surface; instability of the water repellent composition itself, especially in regard to the effect thereon of low temperatures, detergents and water and, difficulty of application, i.e., the necessity for using high temperatures in both the application and drying steps, among others.

Well known for their use alone or in combination with other materials as water repellent agents are the aluminum salts of fatty acids, especially aluminum stearates. Despite the many desirable properties of the aluminum stearates, their use has been hindered somewhat by the relative insolubility thereof in halogenated organic solvents, e.g., perchloroethylene. That is to say that, amounts of the stearates in excess of approximately 10% by weight in perchloroethylene tend to form insoluble gels that are relatively useless, at least insofar as their use in a water repellent composition is concerned. Nevertheless the physical and chemical properties of the aluminum salts of fatty acids as well as their economic attractiveness would make their use in water repellent compositions, especially compositions for treating textile fabrics, quite desirable provided the aforementioned disadvantages could be overcome.

STATEMENT OF THE INVENTION

An object of the present invention is to provide a composition for imparting water repellency to a wide variety of materials.

Another object of the present invention is to provide a composition especially effective for imparting water repellency to textile fabrics which composition is without the several disadvantages of the prior art compositions.

A further object of the present invention is to provide a process for the production of a composition useful for imparting water repellency to a variety of materials which process allows the inclusion in the composition of relatively large amounts of compounds heretofore insoluble in these amounts.

Another object of the present invention is to provide a process for imparting water repellency to a wide variety of surfaces using an improved composition for this purpose.

These and other objects of the present invention will become apparent to those skilled in the art from the description that follows.

It has now been found that excellent properties in terms of water repellency may be imparted to a surface, particularly a textile fabric surface, by contacting said surface with a composition comprising a mixture of (a) a Werner-type chromium co-ordination compound, (b) a fatty acid quaternary ammonium chloride, (c) an aluminum salt of a fatty acid and (d) a halogenated organic solvent, and subsequently evaporating the halogenated organic solvent from the surface being treated. When, as in the preferred embodiment, the surface being treated is a textile fabric, the water repellent composition will be diluted with from 2–20 parts by weight of a drycleaning solvent such as perchloroethylene prior to use. More specifically, the composition comprises a mixture of (a) from about 1–5% by weight of a Werner-type chromium co-ordination compound, (b) from about 2–10% by weight of a fatty acid quaternary ammonium chloride, (c) from about 15–35% by weight of an aluminum salt of a fatty acid and (d) the balance being a halogenated organic solvent.

Heretofore it has not been possible to produce a composition of the type described above for the aforementioned reason that the aluminum salts of fatty acids are not generally soluble in halogenated organic solvents to the extent required to produce an effective water repellent composition. It has now been found, however, that the fabrication of such a composition is possible provided that the various ingredients are added and mixed according to the herein described sequence. More specifically, it has been found that the desired composition may be obtained by first dissolving the Werner-type chromium co-ordination compound and the fatty acid quaternary ammonium chloride in the halogenated organic solvent and then subsequently adding thereto and dissolving therein the aluminum salt of the fatty acid. By this method relatively large and effective amounts of aluminum salts of fatty acids may be incorporated into the water repellent composition.

DESCRIPTION OF THE PREFERRED EMBODIMENTS

By the term "Werner-type chromium co-ordination compound" it is intended to refer to a compound wherein a trivalent chromium salt is complexed with a carboxylic acid group having at least 10 carbon atoms, preferably from 12 to 20 carbon atoms. Illustrative of these compounds are myristato, palmitato, laurato, arachidato, oleato, linoleato and stearato chromic chlorides. Especially useful in the compositions of the present invention is stearato chromic chloride, e.g., $$[Cr_2(OH)C_{17}H_{35}COO]Cl_4$$

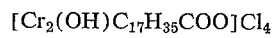

These compounds are more fully described in U.S. Patent No. 2,273,040. These compounds are useful in the practice of the present invention within the range of from about 1–5% by weight, preferably 2–4% by weight. The use of amounts of less than 1% by weight of the chromium coordination compound is not recommended since poorer water repellency and reduced solubility of the aluminum salt of fatty acid will result. On the other hand, while amounts in excess of 5% by weight of the Werner-type chromium co-ordination compound may be used, the practice is not generally recommended, especially in the treatment of light colored textile fabrics, for the reason that these chromium co-ordination compounds are highly colored and would therefore tend to act as a dye on the fabric.

By the term "fatty acid quaternary ammonium chloride" it is intended to refer to the quaternary ammonium chlorides containing lower alkyl groups selected from the group consisting of methyl, ethyl and propyl groups and at least one fatty acid group having a carbon chain length in excess of ten carbon atoms. It is not required that the compounds used be "pure" with respect to the fatty acid portion thereof but rather they may be a mixture of fatty acids as is obtained from natural sources of fats and oils such as tallow, olive oil, cottonseed oil, etc. Especially preferred at this time are the dialkyl di-fatty acid quaternary ammonium chlorides such as dimethyl di-coco quaternary ammonium chloride wherein the fatty acid portion of the compound is obtained from a natural source, i.e., cocoanut oil, and comprises a mixture of fatty acids having a range of from 10 to 22 carbon atoms and containing both saturated and unsaturated fatty acid components such as stearic, oleic, palmitic, lauric, and the like. Another example of this type of compound is dimethyl diarachidyl/behenyl quaternary ammonium chloride in which the fatty acid portion is a mixture primarily of arachidic and behenic acids with minor amounts of stearic acid. Of course, quaternary ammonium chlorides in which the fatty acid components are all alike, such as trimethyl stearyl, diethyl di-palmityl and trimethyl oleyl quaternary ammonium chlorides and others, are useful. Thus, generally speaking a quaternary ammonium chloride having at least one fatty acid group having a carbon chain length within the range of from 10 to 22 carbon atoms is satisfactory for the purpose of this invention. It has been noted, however, that compounds having a predominant portion of their fatty acid content within the 12–18 carbon atom range are particularly useful in the practice of this invention since they impart a beneficial effect to the final composition in that the gel point of the water repellent solution is lowered through their use as opposed to the use of longer chain fatty acids. The fatty acid quaternary ammonium chlorides are useful in the practice of the present invention within the range of from about 2–10% by weight, especially 3–7% by weight.

By the use of the term "aluminum salt of a fatty acid" it is intended to refer to the aluminum salts of fatty acids containing from 16–22 carbon atoms, especially the monobasic aluminum di-fatty acids. Illustrative of this type of compound are the monobasic aluminum distearates, palmitates, oleates, linoleates, margarates, linolenates, etc. While it is possible to use aluminum salts having three fatty acid groups, aluminum tristearate for example, their use is not preferred at this time because of their tendency to raise the gel point of the resultant water repellent composition. On the other hand, aluminum salts having only one fatty acid substituent, i.e., dibasic aluminum monostearate, may be used but again are not preferred for the reason that they are not as effective in their water repellent properties. As mentioned above, it is preferred that the fatty acid portion of the aluminum salt contain from 16 to 22 carbon atoms, with 18 carbon atoms, e.g., stearic acid, being preferred. Generally speaking, a reduction in the number of carbon atoms in the fatty acid chain lessens the effectiveness of the compound as a water repellent whereas the use of a longer chain fatty acid results in a lessening of the solubility of the aluminum salt formed therefrom and generally detracts from the physical properties of the compositions formed therewith. The aluminum salts of the fatty acids as described above are useful in the practice of the present invention within the range of from about 15–35% by weight, especially 20–30% by weight, of the total composition.

The halogenated organic solvents useful in the practice of the present invention are the lower alkyl halides such as methyl, ethyl and propyl halides, illustrative of which are carbon tetrachloride, ethylene dichloride, trichloroethylene, perchloroethylene (i.e., tetrachloroethylene) propylene dichloride, trichloro-trifluoroethane and the like. Especially preferred at this time because of its widespread use in the drycleaning field is perchloroethylene. The amount of halogenated organic solvent used will be that quantity which, in combination with the aforementioned ingredients, is sufficient to total 100%, that is, generally within the range of 50–82% by weight of the total composition. Preferably at this time, however, it is recommended that from 60–70% halogenated organic solvent be used in the total composition.

Thus, in summary of the above, a preferred embodiment of the composition of the present invention would comprise (a) from 2–4% by weight stearato chromic chloride, (b) from 3–7% by weight of dimethyl, dicoco quaternary ammonium chloride, (c) from 20–30% by weight aluminum distearate and with (d) the balance being perchloroethylene.

While the above-disclosed four component system is perfectly satisfactory for use as a water repellent, it is preferred, especially wherein textile fabrics are to be treated, that the composition also contain a microcrystalline petroleum wax. Thus it is preferred at this time to add from 0–10% by weight, preferably 2–6% by weight, of a wax of the above nature, said wax being of sufficient purity that its color ranges from white to a very light amber.

As mentioned hereinbefore, it is now possible to prepare compositions of the present invention containing relatively large amounts of aluminum salts of fatty acids by the use of a controlled sequence for adding and mixing the various components of the composition. More specifically, it is necessary that prior to the addition of the aluminum salt of the fatty acid there be first dissolved in the halogenated organic solvent both the Werner-type chromium co-ordination compound and quaternary ammonium chloride. If one attempts to add the aluminum salt to the halogenated solvent prior to the dissolution therein of the chromium co-ordination compound and fatty acid quaternary ammonium chloride, the solution will gel when a concentration in excess of approximately 10% by weight is obtained. When, as in the preferred embodiment of this invention, the microcrystalline wax is also to be included in the composition, it has been noted that its order of addition is apparently not important. That is to say that, the wax may be added either before or after the addition of the aluminum salt of the fatty acid.

More specifically, one method of preparing the composition of this invention would be as follows. A quantity of perchloroethylene is added to a clean dry vessel and is heated to approximately 170–200° F. To this is added the fatty acid quaternary ammonium chloride with stirring until dissolved. Subsequently the microcrystalline wax and the Werner-type chromium co-ordination compound are added, again with stirring until dissolution is effected. Then, while continuing agitation and maintaining the temperature within the above-stated range, the aluminum salt of the fatty acid is added and the mixture is maintained at the stated temperature for about 60 minutes. After allowing the solution to cool to room temperature, it is then ready for use. Obviously, because of the somewhat volatile nature of the perchloroethylene, it will be desirable to conduct the above operation in a closed vessel.

While the water repellent properties of the compositions of the present invention are independent of the natude of the surface to which they are applied and therefore may be applied to a variety of surfaces such as wood, paper, and the like, they will find their principal application in the treatment of textile fabrics and especially in the treatment of textile fabrics subsequent to their cleaning by known dry cleaning methods. It is a general practice in the dry cleaning industry to treat materials such as rainwear with a water repellent composition after cleaning same since most water repellent treatments used on textile fabrics are non-permanent in nature and, hence, will have been removed by the dry cleaning operation. The type of textile fabrics which may be treated in this manner include cotton, Dacron-cotton, rayon, Dacron, Orlon, nylon, silk and others. Although it will be seen that the compositions of the present invention are useful in the treatment of all of the above-mentioned materials, they will find particular use in the treatment of cotton and Dacron-cotton materials.

In practice, for the treatment of textile fabrics the compositions of the present invention are not used in their full strength form but rather are diluted with a common dry cleaning solvent, such as perchloroethylene or Stoddard solvent. The extent of the dilution will vary for the reasons explained hereinbelow, but generally, about one part of the water repellent composition may be used with from about 2–20 parts by volume of the dry cleaning solvent. The method of applying the water repellent compositions is quite simple and consists merely in contacting the textile fabric to be treated with a solution of the water repellent composition, as by dipping therein, removing the treated fabric which is now saturated with respect to the diluted water repellent composition and extracting same to the desired degree of solvent retention followed by drying of the treated fabric to remove the dry cleaning solvent and leave deposited thereon the water repellent composition. The extent to which the water repellent compositions are to be diluted with the dry cleaning solvent is dependent primarily upon the efficiency of the solvent extraction step, i.e., on the amount of solvent, which solvent contains the water repellent composition, retained by the fabric after extraction. That is to say that if, for various reasons, a large amount of solvent is retained after the extraction step, it will follow that this solvent need not be highly concentrated with respect to the water repellent. Conversely, however, if the solvent extraction step is efficient and removes a larger portion of the treating solution, it will be necessary that the solution be more concentrated with respect to the water repellent composition if the same quantity of water repellent is to be ultimately retained by the fabric treated therein.

The method of using the water repellent compositions of this invention is quite simple in nature and therefore requires relatively little in the way of extra equipment or added expense. Thus, the article to be treated, in the case of a textile fabric for example, is merely immersed at room temperature in the water repellent solution diluted with a dry cleaning solvent as explained above, followed by extraction to the required degree of solvent retention and finally by drying, again at room temperature. Since there is no need to use elevated temperatures in either the application of the water repellent composition or in the drying or solvent removal steps, not only may it be said that the treatment is economical but also there is less likelihood of damage to the textile fabric being treated. It should be noted, however, that should it be desired that heat be used, to speed drying for instance, said application of heat will in no way impair the water repellent properties of the treated fabric.

It will be obvious to one skilled in the art that a large number of advantages over prior art compositions will be evidenced by the use of the compositions of the present invention, especially by their use in the treatment of textile fabrics.

For instance, previous compositions have generally had as their solvent base a mineral spirit such as kerosene or Stoddard solvent and for this reason they have had relatively low flash points therefore creating a potential fire hazard and making their use in the dry cleaning industry somewhat dangerous. The instant compositions, however, having a base of a halogenated organic solvent, have no flash point whatsoever and subsequently are not subject to restrictions as being potential fire hazards. For this same reason of having a base of a halogenated organic solvent, the instant compositions may be used by a dry cleaner in admixture with any of the usual dry cleaning solvents such as perchloroethylene or Stoddard solvent. The dilution of the subject compositions with a dry cleaning solvent, especially perchloroethylene, requires no application of heat but proceeds merely with agitation.

A further advantage of the compositions of the present invention relates especially to their application to textile fabrics wherein both the application of the solvent-diluted water repellent to the fabric and removal of the solvent therefrom may occur at room temperature thereby lessening the amount of solvent loss by evaporation and preventing the degradation of the textile fabric being treated; this in addition to the economic advantages inherent in the elimination of the heat requirement. In prior processes it has been required to apply heat in most instances at least to the drying step for the reason that any wax component of the water repellent composition would have to be melted onto the fabric in order for the treatment to be effective. The fact that this melting of the wax is no required in the instant case is in itself a further advantage to be obtained through the use of the compositions of the present invention in that previous compositions requiring this melting had a tendency to seal the pores of the textile fabric being treated therewith. It is now possible, however, to maintain the permeability of the fabric being treated with respect to air and water vapor, while still effectively preventing the passage of water.

The present water repellent compositions also exhibit remarkable stability on storage and also excellent stability to the action thereon of heat, cold, detergents and water. In the National Institute of Dry Cleaning's Technical Bulletin No. T–240 entitled "Water Repellents, Part 1" the problem of the lack of stability exhibited by most of the water repellent compositions currently in use by the dry cleaning industry is discussed and an evaluation of a number of these water repellent products is presented. Difficulties insofar as the instability of the compositions once diluted with a dry cleaning solvent are said to be attributed to a number of factors. Among these factors is the presence of traces of moisture in even the purest of dry cleaning solvents along with the fact that moisture can also be absorbed from the atmosphere. This moisture in turn can cause the hydrolysis of certain components of the water repellent composition. As a result of this hydrolysis, solids may settle out of the solution or, if used to treat textile fibers, such a solution can cause spotting or streaking of the fabric treated therewith. A further type of instability is noticed when the treating bath is exposed to low temperatures thereby causing a turbidity to develop within the solution. Again this turbidity is evidence that certain ingredients of the water repellent composition are no longer truly in solution but rather are in suspension and consequently there is the possibility that the use of a solution of water repellent in this condition may result in spotting or streaking of fabrics treated therein. The stability, or rather the lack thereof, to detergents on the part of water repellent solutions is a problem of a different type than that of low temperature or moisture stability. In this instance the detergents, which are carried over from the dry cleaning baths in which the textile fabrics are cleaned, being essentially wetting agents, will have just the opposite effect as that of the water repellent composition and will tend to neutralize the repellent thereby rendering the treatment ineffectual. It is therefore necessary to employ rinse baths between the dry cleaning operation and the application of the water repellent composition in order to reduce the carry-over of detergents to an absolute minimum.

It can be said, however, that the compositions of the present invention exhibit excellent stability insofar as all of the above problems are concerned. As is pointed out more specifically in the illustrative examples that follow hereinbelow, the instant compositions have a very low gel point (the temperature at which the components of the composition set or increase in viscosity to form a gel which may be redissolved only by the application of heat) as well as a low cloud point (the temperature at which the solution develops a visible turbidity) when used in combination with a dry cleaning solvent. Furthermore, their resistance to the harmful effects of detergent carry-over and the ability of the solutions to remain in a clearly dissolved state for long periods of time are also to be noted.

In addition to the aforementioned properties which are inherent in the water repellent solutions of the present invention, the use of these solutions, besides imparting an excellent water repellent finish to textile fabrics treated therewith, also results in other improvements when compared with prior art treatments. For instance, many of these prior compositions have had a tendency to yellow textile fabrics treated therewith, especially cotton fabrics. While this yellowness often is visible immediately upon removal of the fabric from the bath containing the water repellent, it is especially to be noted when the fabric is subsequently subjected to elevated temperatures for a period of time as in storage. Fabrics treated in the compositions of the present invention however, show no tendency to yellow even upon storage for a number of days at an elevated temperature. Another undesirable property imparted to fabrics treated with prior art compositions has been the stiffness or the boardiness of the fabric. This property has probably been the result of the nature of the chemicals employed in these compositions, especially their high wax content. The present compositions, however, when used to treat textile fabrics, result in a treated fabric that is to be noted for its lack of boardiness. A further disagreeable characteristic of fabrics treated with heretofore available compositions has been the presence of residual and disagreeable odors on these treated fabrics. This odor is not to be found on fabrics treated with the compositions of the present invention.

In order that those skilled in the art may more readily understand the present invention the following illustrative examples are afforded.

EXAMPLE 1

Stock solutions for the preparation of water repellent compositions are as follows: Solution A, 1040 ml. of perchloroethylene, 3 gms. of Quilon C (trademark of E. I. du Pont de Nemours & Co. for stearato chromic chloride) and 33 gms. of monobasic aluminum distearate; Solution B, 1040 ml. of perchloroethylene, 3 gms. of Quilon C and 33 gms. of Kemamine Q–1902C (trademark of the Humko Products Chemical Division of the National Dairy Products Corp. for dimethyl di-arachidyl/behenyl quaternary ammonium chloride); Solution C, 1040 ml. of perchloroethylene, 3 gms. of Quilon C and 33 gms. of white microcrystalline petroleum wax. Table I shows the use of these solutions in various combinations and proportions and the comparative degree of water repellency imparted to cotton test fabrics thereby. Proportions given in the table are parts by volume. The test for water repellency used in this instance is merely to place a bead of water on the treated dried fabric by means of an eye-dropper. The fabrics then "fail" the test when the water is no longer present as a bead but has dispersed into or through the fabric. In evaluating the results, the lower the number the more effective is the water repellent, that is, a rating of 1 failed last, 7 failed first.

TABLE I

| Sample No.: | Solution A | Solution B | Solution C | Rating |
|---|---|---|---|---|
| 1 | 100 | | | 2 |
| 2 | | 100 | | 5 |
| 3 | | | 100 | 7 |
| 4 | 80 | 20 | | 3 |
| 5 | 80 | | 20 | 4 |
| 6 | | 80 | 20 | 6 |
| 7 | 80 | 10 | 10 | 1 |

It can be readily seen from the above that the most effective combination of ingredients is that of Sample 7 illustrating a preferred embodiment of the present invention wherein the Werner-type chromium co-ordination compound, the aluminum salt of the fatty acid, the quaternary ammonium chloride, perchloroethylene and the wax are all present. Sample 4, illustrating the basic concept of the present invention wherein the chromium co-ordination compound, the aluminum salt and the quaternary compound are present without the wax, is also shown to be very effective, failing only slightly before the preferred composition. Whereas it would appear from its rating that a composition such as in Sample 1 is quite effective, it should be noted that a solution such as this cannot be provided in a concentrated form for the reason, detailed previously, that solutions of aluminum salts of fatty acids tend to form gels when present in excess of 10% by weight and therefore a commercially acceptable product cannot be formulated.

EXAMPLE 2

This example illustrates the properties and use of a composition of the present invention in comparison with a number of other commercially available water repellent compositions. For the purpose of this example, a quantity of water repellent composition is prepared which contains 64% by weight perchloroethylene, 3% by weight Quilon C, 3.3% by weight Kemamine Q–1902C, 3.3% by weight of microcrystalline petroleum wax and 26.4% by weight of monobasic aluminum distearate. The flash points of the various solutions are determined, according to ASTM test designation number D56, prior to dilution with the dry cleaning solvent, i.e., perchloroethylene, to be used in the further evaluation of the compositions. Treating solutions are prepared according to the dilutions represented in Table II below, e.g., one part water repellent composition to five parts perchloroethylene or one part repellent to ten parts perchloroethylene, all parts by volume, each of these treating solutions totalling 120 milliliters. The method of preparing the cloth test panels for evaluation is as follows. A cloth test panel 7" by 7" is immersed for 5 minutes in a solution consisting of 1% detergent in perchloroethylene and subsequently extracted to 50% solvent retention, i.e., a 50% increase by weight in the original weight of the test panel, and dried at room temperature. The dry panels are now subjected to the treating solution by immersing therein for 5 minutes at room temperature. Extraction to 50% and drying at room temperature complete the process. In order to assist in the evaluation of the test results, test panels of the varous fabrics are carried through the above procedure with the exception that the water repellent treating solution contains only perchloroethylene. These panels may then serve as "blanks" and provide a basis for comparison. The evaluation of the effectiveness of the water repellent treatment is conducted according to method number 22–1964 of the American Association of Textile Chemists and Colorists. Briefly, this test comprises directing a spray of water from a standard nozzle onto the top surface of the treated textile fabric. The degree of water repellency is then determined by comparing the test specimen with a standard chart illustrating various degrees of water repellency. The degree of yellowness is determined on a reflectometer using an 80 percent magnesium oxide plate as a backing. Measurements are taken using amber, blue and green filters and the yellowness indices are then determined according to the formula; yellowness=amber—blue÷green. The boardiness of the treated fabric is determined by suspending a portion of that fabric over the end of a block of rigid material and measuring the droop of the fabric on a millimeter scale having a 90° arc.

after a period of six weeks. The cloud point of the diluted solution, i.e., the point at which the solution is no longer clear due to the appearance of suspended solids, is determined to be less than 38° F. Thus, the compositions of the present invention are shown to have excellent stability both with relation to low temperatures, as evidenced by the gel point and cloud point values, and to moisture, as evidenced by its stability upon storage.

TABLE II

| Treating Solution | Applicant's | Prior Art | | | | | |
|---|---|---|---|---|---|---|---|
| | | A | B | C | D | E | None |
| Flash Point (° F.) | None | 108 | 134 | 130 | 130 | 94 | |
| Form (70° F.) | Liquid | Solid | Liquid | Solid | Solid | Suspension | |
| Water Repellency Rating: [1] | | | | | | | |
| Cotton: | | | | | | | |
| Dilution 1:5 | 90–100 | 90–100 | 0–50 | 90–100 | 90 | 90–100 | 0 |
| Dilution 1:10 | 80–90 | 90 | 0–50 | 80–90 | 80–90 | 80–90 | 0 |
| Cotton/Dacron: | | | | | | | |
| Dilution 1:5 | 90–100 | 90–100 | 0–50 | 90–100 | 90 | 90 | 0 |
| Dilution 1:10 | 90 | 90–100 | 0–50 | 80–90 | 80–90 | 70–80 | 0 |
| Yellowness: [2] | | | | | | | |
| Cotton: | | | | | | | |
| Dilution 1:5 | 0.020 | 0.050 | 0.087 | 0.047 | 0.040 | 0.053 | 0.039 |
| Dilution 1:5 [3] | 0.022 | 0.069 | 0.147 | 9.104 | 0.075 | 0.085 | 0.039 |
| Dilution 1:10 | 0.026 | 0.046 | 0.059 | 0.055 | 0.042 | 0.048 | 0.039 |
| Cotton/Dacron: | | | | | | | |
| Dilution 1:5 | 0.021 | 0.045 | 0.073 | 0.070 | 0.043 | 0.043 | 0.043 |
| Dilution 1:10 | 0.045 | 0.031 | 0.051 | 0.042 | 0.040 | 0.040 | 0.043 |
| Boardiness: [4] | | | | | | | |
| Cotton: | | | | | | | |
| Dilution 1:5 | 38 | 35 | 26 | 20 | 36 | 36 | 57 |
| Dilution 1:10 | 60 | 30 | 27 | 25 | 47 | 25 | 57 |
| Cotton/Dacron: | | | | | | | |
| Dilution 1:5 | 41 | 40 | 33 | 40 | 36 | 36 | 54 |
| Dilution 1:10 | 56 | 35 | 40 | 50 | 46 | 31 | 54 |

[1] See the following:
  100=No sticking or wetting of upper surface.
  90–100=Slight random sticking to upper surface.
  90=Slight random wetting of upper surface.
  80–90=Sticking to upper surface at spray points.
  80=Wetting of upper surface at spray points.
  70–80=Partial wetting of most of upper surface.
  0–50=Complete wetting of all of upper surface, partial wetting lower surface.
  0=Complete wetting of all of upper and lower surfaces.
[2] Higher number is yellowest. Yellowness indices in excess of 0.045 appear yell
[3] Cloth stored for one week at 120° F. after treatment and before reading.
[4] Lowest number most boardy (stiffest).

It can readily be seen from the above table that the compositions of the present invention have no measurable flash point despite their advantageous physical form, i.e., liquid. Furthermore, the water repellent compositions of the present invention are shown to be quite satisfactory and are equal to or superior to the competitive products against which they are tested. The instant products are also to be noted for the fact they do not yellow fabrics treated therewith to any appreciable extent and for the further fact that fabrics treated therewith show little or no tendency to stiffen after drying as evidenced by the boardiness test.

EXAMPLE 3

A water repellent composition is prepared by placing 64 grams of perchloroethylene into a clean, dry, covered, mixing vessel provided with a stirrer and with means by which the solution therein may be heated. The solvent is heated to 176° F. whereupon 3.3 grams of Kemamine Q-6502C (trademark of the Humko Products Chemical Division of National Dairy Products Corporation for a dimethyl di-coco quaternary ammonium chloride) is added with stirring until dissolved. This is followed by the addition of 3 grams of Quilon C and 3.3 grams of microcrystalline petroleum wax which are mixed until a solution is obtained while maintaining the temperature at approximately 176° F. There is now added 26.4 grams of monobasic aluminum distearate. After dissolution, the product is maintained at a temperature of 170–200° F. for 60 minutes after which time it is cooled to room temperature. When one part by volume of this product is diluted with 5 parts by volume of perchloroethylene and stored in a closed container, there is no evidence of separation of the various components of the mixture even

EXAMPLE 4

The water repellent composition of Example 3 is used according to the procedure outlined in Example 2 to test its effectiveness on other fabrics, i.e., acetate crepe, Dacron batiste and nylon taffeta. In all cases, good results in terms of water repellency are obtained, with the acetate and Dacron materials responding to the treatment somewhat better than the nylon material.

It is to be understood that although the invention has been described with specific reference to particular embodiments thereof it is not to be so limited since changes and alterations therein may be made which are within the full and intended scope of this invention as defined by the appended claims.

What is claimed is:
1. A composition for imparting water repellency to a surface which composition comprises a mixture of:
 (a) from 1–5 percent by weight of a Werner-type chromium co-ordination compound, which compound is a complex of a trivalent chromium salt with a carboxylic acid group having at least 10 carbon atoms,
 (b) from 2–10 percent by weight of a fatty acid quaternary ammonium chloride, which chloride contains lower alkyl groups selected from the group consisting of methyl, ethyl and propyl groups and at least one fatty acid group having a carbon chain length in excess of 10 carbon atoms,
 (c) from 15–35 percent by weight of an aluminum salt of a fatty acid, which fatty acid contains from 16–22 carbon atoms, and
 (d) from 50–82 percent by weight of a halogenated organic solvent.

2. A composition as in claim 1 which also contains up to 10 percent by weight of a microcrystalline petroleum wax.

3. A composition as in claim 1 wherein the Werner-type chromium co-ordination compound is stearato chromic chloride.

4. A composition as in claim 1 wherein the fatty acid quaternary ammonium chloride is a dimethyl di-coco quaternary ammonium chloride.

5. A composition as in claim 1 wherein the aluminum salt of the fatty acid is monobasic aluminum di-stearate.

6. A composition as in claim 1 wherein the halogenated organic solvent is perchloroethylene.

7. A method for producing a composition capable of imparting water repellency to a surface which method comprises the steps of:
  (a) dissolving a mixture of from 1–5 percent by weight of a Werner-type chromium co-ordination compound, which compound is a complex of a trivalent chromium salt with a carboxylic acid group having at least 10 carbon atoms, and from about 2–10 percent by weight of a fatty acid quaternary ammonium chloride, which chloride contains lower alkyl groups selected from the group consisting of methyl, ethyl and propyl groups and at least one fatty acid group having a carbon chain length in excess of 10 carbon atoms, and from 50–82 percent by weight of a halogenated organic solvent and,
  (b) subsequently adding thereto and dissolving therein from 15–35 percent by weight of an aluminum salt of a fatty acid, which fatty acid contains from 16–22 carbon atoms.

8. A method as in claim 7 wherein the Werner-type chromium co-ordination compound is stearato chromic chloride.

9. A method as in claim 7 wherein the fatty acid quaternary ammonium chloride is a dimethyl di-coco quaternary ammonium chloride.

10. A method as in claim 7 wherein the halogenated organic solvent is perchloroethylene.

11. A method as in claim 7 wherein the aluminum salt of the fatty acid is monobasic aluminum di-stearate.

12. A method for imparting water repellency to a surface which method comprises contacting said surface with a composition comprising a mixture of:
  (a) from 1–5 percent by weight of a Werner-type chromium co-ordination compound, which compound is a complex of a trivalent chromium salt with a carboxylic acid group having at least 10 carbon atoms;
  (b) from 2–10 percent by weight of a fatty acid quaternary ammonium chloride, which chloride contains lower alkyl groups selected from the group consisting of methyl, ethyl and propyl groups and at least one fatty acid group having a carbon chain length in excess of 10 carbon atoms;
  (c) from 15–35 percent by weight of an aluminum salt of a fatty acid, which acid contains from 16–22 carbon atoms, and,
  (d) from 50–82 percent by weight of a halogenated organic solvent,
and subsequently evaporating the halogenated organic solvent therefrom.

13. A method as in claim 12 wherein the composition also contains up to 10 percent by weight of a microcrystalline petroleum wax.

14. A method as in claim 12 wherein the Werner-type chromium co-ordination compound is stearato chromic chloride.

15. A method as in claim 12 wherein the fatty acid quaternary ammonium chloride is a dimethyl di-coco quaternary ammonium chloride.

16. A method as in claim 12 wherein the aluminum salt of the fatty acid is monobasic aluminum di-stearate.

17. A method as in claim 12 wherein the halogenated organic solvent is perchloroethylene.

18. A method as in claim 12 wherein the composition is diluted prior to use with from 2–20 parts by volume of a dry cleaning solvent selected from the group consisting of trichloroethylene, perchloroethylene and Stoddard solvent.

19. A method as in claim 13 wherein the composition is diluted prior to use with from 2–20 parts by volume of a dry cleaning solvent selected from the group consisting of trichloroethylene, perchloroethylene and Stoddard solvent.

References Cited

UNITED STATES PATENTS

| | | | |
|---|---|---|---|
| 2,447,064 | 8/1948 | Gebhart et al. | 260—414 |
| 3,034,925 | 5/1962 | De Marco et al. | 117—121 |
| 3,284,215 | 11/1966 | Bartz | 106—2 XR |
| 3,310,429 | 3/1967 | Gunnar et al. | 106—13 XR |
| 3,406,032 | 10/1968 | Enders et al. | 106—271 |

JULIUS FROME, Primary Examiner

L. HAYES, Assistant Examiner

U.S. Cl. X.R.

106—287; 117—135.5; 252—8.8